US011300741B2

(12) United States Patent
Sahoo et al.

(10) Patent No.: US 11,300,741 B2
(45) Date of Patent: Apr. 12, 2022

(54) LEAF SHAPED INTERMITTENT BONDED OPTICAL FIBRE RIBBON

(71) Applicant: Sterlite Technologies Limited, Gurgaon (IN)

(72) Inventors: Kishore Sahoo, Gurgaon (IN); Swapnil Sharma, Gurgaon (IN); Akhil Garg, Gurgaon (IN)

(73) Assignee: STERLITE TECHNOLOGIES LIMITED, Gurgaon (IN)

( * ) Notice: Subject to any disclaimer, the term of this patent is extended or adjusted under 35 U.S.C. 154(b) by 0 days.

(21) Appl. No.: 17/139,527

(22) Filed: Dec. 31, 2020

(65) Prior Publication Data
US 2021/0271040 A1 Sep. 2, 2021

(30) Foreign Application Priority Data

Feb. 27, 2020 (IN) .............................. 202011008364

(51) Int. Cl.
*G02B 6/44* (2006.01)

(52) U.S. Cl.
CPC ........... *G02B 6/4403* (2013.01); *G02B 6/448* (2013.01); *G02B 6/4413* (2013.01)

(58) Field of Classification Search
CPC ..... G02B 6/4403; G02B 6/4413; G02B 6/448
USPC ......................................................... 385/114
See application file for complete search history.

(56) References Cited

U.S. PATENT DOCUMENTS

2020/0064574 A1\* 2/2020 Fallahmohammadi ...................... G02B 6/448

FOREIGN PATENT DOCUMENTS

WO WO-2016042784 A1 \* 3/2016 ........... G02B 6/4434

\* cited by examiner

*Primary Examiner* — Jerry M Blevins

(57) ABSTRACT

An intermittently bonded optical fibre ribbon includes a plurality of optical fibres. The plurality of optical fibres is defined by at least two adjacent central optical fibers, a first plurality of optical fibers and a second plurality of fibers. The at least two adjacent central optical fibers are sandwiched between the first plurality of optical fibers and the second plurality of optical fibers. The at least two adjacent central optical fibers are fully bonded along length of the at least two central fibres. The first plurality of fibers and the second plurality of optical fibers are bonded partially along non-central length of the plurality of optical fibres.

10 Claims, 3 Drawing Sheets

LEAF SHAPED INTERMITTENT BONDED OPTICAL FIBRE RIBBON

CROSS-REFERENCE TO RELATED APPLICATIONS

The present application is based on, and claims priority from an Indian Application Number 202011008364 filed on 27 Feb. 2020, the disclosure of which is hereby incorporated by reference herein.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates to the field of optical fibre and in particular, relates to an optical fibre ribbon with leaf like intermittent bonding.

Description of the Related Art

With the evolution of 5G and increase of data consumption in the recent years, application of data centres and Telecoms have increased drastically. In addition, large scale data centres and Telecom sectors require ultra-high fibre density cables which offers high data rate with low latency. The high fibre density cables include a large number of optical fibres inside cable. The optical fibres may be in the form of optical fibre ribbons or loose fibres. Traditionally, structure of the optical fibre cables includes buffer tube, buffer tube sheath, and optical fibre ribbons. The buffer tube and sheath protects the optical fibres from physical damage. Conventionally, poor packing efficiency of the optical fibre ribbons leads to the increase of cable diameter in the high fibre count cables. In addition, a higher diameter cables lead to difficulty in handling, transport, installation and increase in cost. Further, conventional high fibre count cables are inefficient at junction points and manhole installation. Furthermore, the optical fibre ribbons of the conventional high fibre count cables collapse when load or force is applied at centre of the optical fibre ribbons. Moreover, linear scaling to achieve high fibre count in conventional high fibre count cables manufacturing is impractical.

In light of the above stated discussion, there is a need for an efficient and effective optical fibre cable that overcomes the above stated disadvantages.

BRIEF SUMMARY OF THE INVENTION

In an aspect, the present disclosure provides an intermittently bonded optical fibre ribbon. The intermittently bonded optical fibre ribbon includes a plurality of optical fibres. The plurality of optical fibres is defined by at least two adjacent central optical fibres, a first plurality of optical fibres and a second plurality of fibres. The at least two adjacent central optical fibres are sandwiched between the first plurality of optical fibres and the second plurality of optical fibres. The at least two adjacent central optical fibres are fully bonded along length of the at least two central fibres. The first plurality of optical fibres and the second plurality of optical fibres are bonded partially along non-central length of the plurality of optical fibres.

The at least two adjacent central fibers may be joined by a central bond. The first plurality of optical fibers may be joined by a first plurality of bonds and the second plurality of optical fibers may be joined by a second plurality of bonds. The first plurality of bonds and the second plurality of bonds are originated outwards from the central bond. The first plurality of bonds and the second plurality of bonds are arranged in a leaf like pattern.

The first plurality of optical fibers may be joined by a first plurality of bonds and the second plurality of optical fibers may be joined by a second plurality of bonds. The first plurality of bonds and the second plurality of bonds are arranged in a leaf like pattern. The leaf like pattern may repeat periodically in a longitudinal direction of the intermittently bonded optical fibre ribbon.

The at least two adjacent central fibers may be joined by a central bond. The first plurality of optical fibers may be joined by a first plurality of bonds and the second plurality of optical fibers may be joined by a second plurality of bonds. The first plurality of bonds and the second plurality of bonds are originated outwards from the central bond. The first plurality of bonds has a first plurality of veins. The second plurality of bonds has a second plurality of veins. The first plurality of veins and the second plurality of veins are such that subsequent adjacent fibers alternate between bonded adjacent fibers and unbonded adjacent fibers.

The first plurality of bonds and the second plurality of bonds may be at an angle of 30 to 60 degrees from the central bond.

The first plurality of bonds may have the first plurality of veins. The second plurality of bonds may have a second plurality of veins. In addition, number of bonds in the first plurality of veins and the second plurality of veins may vary along the central bond.

The first plurality of optical fibers and the second plurality of optical fibers may be bonded partially along non-central length of the plurality of optical fibres forming a plurality of bonded regions L and a plurality of unbonded regions D along adjacent optical fiber of the first plurality of optical fibers and the second plurality of optical fibers. The plurality of unbonded regions D may have length in a range of 5 millimetres to 100 millimetres. The plurality of bonded regions may have a length L in a range of 2 millimetres to 20 millimetres.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
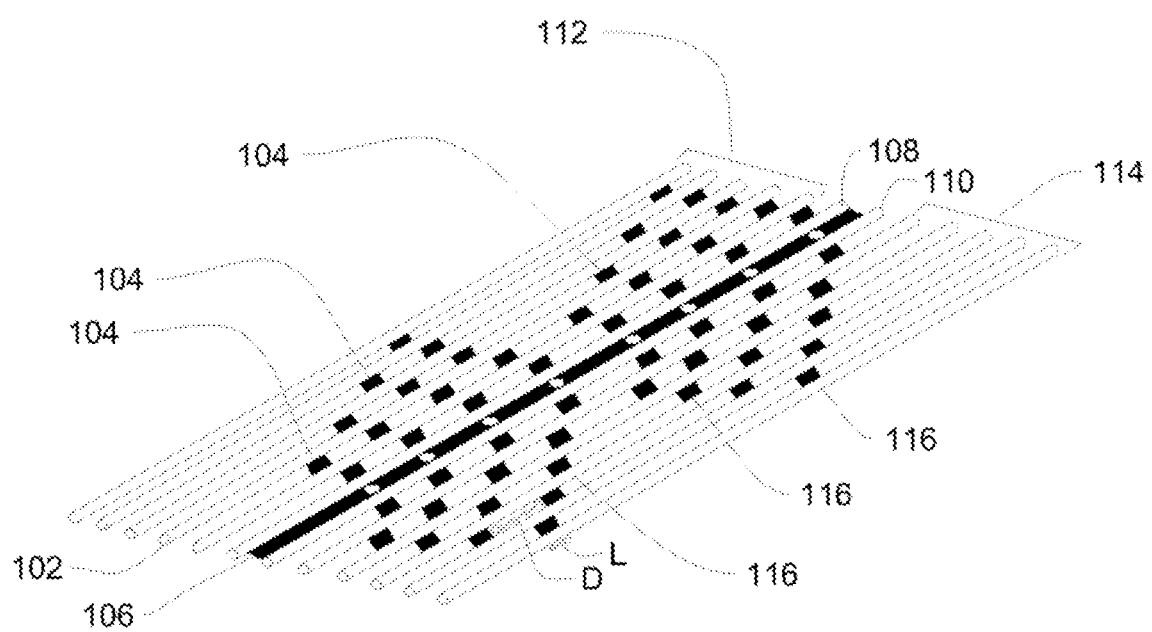
FIG. 1 illustrates an intermittently bonded optical fibre ribbon.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:
100. Intermittently bonded optical fibre ribbon.
102. Plurality of optical fibres.
104. The first plurality of bonds.
106. The central bond.
108. At least two central optical fibres.
110. At least two central optical fibres.
112. The first plurality of optical fibres.
114. The second plurality of optical fibres.
116. The second plurality of bonds.
300. The optical fibre cable.
302. Number of the plurality of bunches.
304. The plurality of optical fibre ribbons.
306. Water blocking tape.
308. Sheath.
310. The plurality of strength members.
312. The plurality of ripcords.
314. The plurality of water swellable yarns.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

According to FIG. 1, this is an intermittently bonded optical fibre ribbon 100. The intermittently bonded optical fibre ribbon 100 has a leaf like intermittently bonding. In general, optical fibre ribbon is used in optical fibre cables that require high fibre count within less installation space. In addition, optical fibre ribbon includes a number of optical fibres. The intermittently bonded optical fibre ribbon 100 has a vein like ribs structured pattern. The vein like ribs structured pattern may repeat periodically along width direction and along length direction of the intermittently bonded optical fibre ribbon 100.

The intermittently bonded optical fibre ribbon 100 includes a plurality of optical fibres 102. In general, optical fibre is a medium associated with transmission of information over long distances in the form of light pulses. In addition, optical fibre is a type of cabling technology that uses light to transmit voice and data communications over long distances. Further, optical fibre is a flexible, and transparent fibre made with silica or plastic slightly thicker than a human hair. A number of the plurality of optical fibres 102 in the intermittently bonded optical fibre ribbon 100 may be 12. A number of the plurality of optical fibres 102 in the intermittently bonded optical fibre ribbon 100 may vary. Each of the plurality of optical fibres 102 in the intermittently bonded optical fibre ribbon 100 may have a diameter in the range of 160 micrometers to 250 micrometers. The diameter of each of the plurality of optical fibres 102 in the intermittently bonded optical fibre ribbon 100 may vary.

The plurality of optical fibres 102 is defined by at least two adjacent central optical fibres 108-110, a first plurality of optical fibres 112, and a second plurality of optical fibres 114. The at least two adjacent central optical fibres 108-110, are sandwiched between the first plurality of optical fibres 112 and the second plurality of optical fibres 114. The at least two adjacent central optical fibres 108-110 are fully bonded along length of the at least two central optical fibres 108-110. The first plurality of optical fibres 112 and the second plurality of optical fibres 114 are bonded partially along non-central length of the plurality of optical fibres 102.

The intermittently bonded optical fibre ribbon 100 may include a first plurality of bonds 104, a central bond 106, and a second plurality of bonds 116. The at least two adjacent central fibres 108-110 may be joined by the central bond 106. The first plurality of optical fibres 112 may be joined by the first plurality of bonds 104. The second plurality of optical fibres 114 may be joined by the second plurality of bonds 116. In addition, the first plurality of bonds 104 and the second plurality of bonds 116 may be originated outwards from the central bond 106. The first plurality of bonds 104 and the second plurality of bonds 116 may be arranged in a leaf like pattern. The leaf like pattern of the first plurality of bonds 104 and the second plurality of bonds 116 provides flexibility to rigid structure of the intermittently bonded optical fibre ribbon 100. In addition, the leaf like pattern of the first plurality of bonds 104 and the second plurality of bonds 116 retains flat structure of the intermittently bonded optical fibre ribbon 100. Each of the first plurality of bonds 104 and the second plurality of bonds 116 may be a rectangular shaped bond. The first plurality of bonds 104 and the second plurality of bonds 116 may have any suitable shape.

Each of the first plurality of bonds 104, the central bond 106, and the second plurality of bonds 116 may b. made of a matrix material. In general, matrix material provides medium to bind and hold reinforcements together into solid. In addition, matrix material provides protection reinforcements from environmental damage, serves to transfer load, and provides finish, texture, color, durability and functionality. Further, matrix material provides various handling characteristics to optical fibres. The various handling characteristics include encapsulation, easy peel and breakout, hardness and the like.

The plurality of optical fibres 102 affixes internally with each other with facilitation of the first plurality of bonds 104, the central bond 106, and the second plurality of bonds 116. In general, bond is used to tie or hold optical fibres together. The first plurality of bonds 104 may be applied intermittently in the first plurality of optical fibres 112. The second plurality of bonds 116 are applied intermittently in the second plurality of optical fibres 114. The first plurality of bonds 104 may have a first plurality of veins. The second plurality of bonds 116 may have a second plurality of veins. The first plurality of veins and the second plurality of veins are such that subsequent adjacent fibres alternate between bonded adjacent fibres and unbonded adjacent fibres. Number of bonds in the first plurality of veins and the second plurality of veins may vary along the central bond 106.

The central bond 106 between the at least two central optical fibres 108-110 is located in a centre of the intermittently bonded optical fibre ribbon 100. The central bond 106 acts as a backbone of the intermittently bonded optical fibre ribbon 100. The central bond 106 may be one of intermittent or continuous. The central bond 106 includes one or more gaps. The one or more gaps may have a square shape, rectangular shape, circular shape or any other shape. The central bond 106 prevents the intermittently bonded optical fibre ribbon 100 from collapsing from the center at a certain breaking load since the central bond 106 may be continuous throughout a length of the intermittently bonded optical fibre ribbon 100. So, the central bond 106 acts as the backbone of the intermittently bonded optical fibre ribbon 100. The central bond 106 facilitates the intermittently bonded optical fibre ribbon 100 to withstand breaking load. Further, the central bond 106 enables each of the plurality of optical fibres 102 of the intermittently bonded optical fibre ribbon 100 to be in same plane.

The first plurality of bonds 104 in the first plurality of optical fibres 112 and the second plurality of bonds 116 in the second plurality of optical fibres 114 are arranged in vein like structured pattern. Number of the first plurality of bonds 104 and the second plurality of bonds 116 in a consecutive vein like structure between the first plurality of bonds 104 and the second plurality of bonds 116 may get reduced by 1. Number of the first plurality of bonds 104 and the second plurality of bonds 116 in each consecutive vein like structure of either of the first plurality of optical fibres 112 and the second plurality of optical fibres 114 may decrease from 5 bonds to 2 bonds in a repetitive manner along the longitudinal direction. The first plurality of bonds 104 and the second plurality of bonds 116 may be arranged in the leaf like pattern. The leaf like pattern may repeat periodically in the longitudinal direction of the intermittently bonded optical fibre ribbon 100.

In a leaf like pattern, the first plurality of optical fibres 112 and the second plurality of optical fibres 114 may be bonded partially along non-central length of the plurality of optical fibres 102. The bonding of the first plurality of optical fibres 112 and the second plurality of optical fibres 114 forms a plurality of bonded regions L and a plurality of unbonded regions D along adjacent optical fibre of the first plurality of optical fibres 112 and the second plurality of optical fibres 114. The plurality of unbonded regions D has length in a range of 5 millimetres to 100 millimetres. Length of the plurality of unbonded regions may vary. The plurality of bonded regions has length L in a range of 2 millimetres to 20 millimetres. The first plurality of bonds 104 and the second plurality of bonds 116 may be at an angle of 30 to 60 degrees from the central bond 106. The first plurality of bonds 104 and the second plurality of bonds 116 may be at any suitable angle from the central bond 106.

The intermittently bonded optical fibre ribbon 100 includes 12 optical fibres. In a leaf like pattern, the first plurality of optical fibres 112 includes the first plurality of bonds 104 from first optical fibre to sixth optical fibre of the plurality of optical fibres 102. Number of the first plurality of bonds 104 between first optical fibre and second optical fibre of the plurality of optical fibres 102 may be 1. In addition, number of the first plurality of bonds 104 between second optical fibre and third optical fibre may be 2. Further, number of the first plurality of bonds 104 between third optical fibre and fourth optical fibre may be 3. Furthermore, number of the first plurality of bonds 104 between fourth optical fibre and fifth optical fibre may be 4. Moreover, number of the first plurality of bonds 104 between fifth optical fibre and sixth optical fibre may be 4. Therefore, total number of the first plurality of bonds 104 in the first plurality of optical fibres 112 may be 14. Total number of the first plurality of bonds 104 in the first plurality of optical fibres 112 may vary.

Further, the at least two central optical fibres 108-110 may include the central bond 106 (as explained above). The at least two central optical fibres 108-110 corresponds to sixth optical fibre and seventh optical fibre of the plurality of optical fibres 102. The central bond 106 between sixth optical fibre and seventh optical fibre may be continuous. The central bond 106 between sixth optical fibre and seventh optical fibre 110 may be intermittent. In addition, number of the central bond 106 between sixth optical fibre and seventh optical fibre may be one. Number of the central bond 106 may vary.

The second plurality of optical fibres 114 may include the second plurality of bonds 116 from seventh optical fibre to twelfth optical fibre. Number of the second plurality of bonds 116 between seventh optical fibre and eighth optical fibre may be 4. In addition, number of the second plurality of bonds 116 between eighth optical fibre and ninth optical fibre may be 4. Further, number of the second plurality of bonds 116 between ninth optical fibre and tenth optical fibre may be 3. Furthermore, number of the second plurality of bonds 116 between tenth optical fibre and eleventh optical fibre may be 2. Moreover, number of the second plurality of bonds 116 between eleventh optical fibre and twelfth optical fibre may be 1. Therefore, total number of the second plurality of bonds 116 in the second plurality of optical fibres 114 may be 14. Total number of the second plurality of bonds 116 in the second plurality of optical fibres 114 may vary. Number of bonds in between any two optical fibres of the second plurality of optical fibres 114 may vary.

Total number of bonds in the intermittently bonded optical fibre ribbon 100 may be 29 if number of bonds between the sixth optical fibre and seventh optical fibre is 1. Total number of bonds in the intermittently bonded optical fibre ribbon 100 may vary.

The plurality of bonded regions L of the first plurality of bonds 104 and the second plurality of bonds 106 has a bond length in range of 2 millimetres to 20 millimetres. The bond length of the first plurality of bonds 104 and the second plurality of bonds 116 has any suitable range. In an example, the bond length of bond between any two optical fibres changes as distance between the two optical fibres changes. The plurality of unbonded regions D of the first plurality of bonds 104 and the second plurality of bonds 116 has a distance in between two consecutive bonds. The distance is in a range of 5 millimetres to 100 millimetres. The distance may vary. Further, the distance between two consecutive bonds in a vein is in the range of zero millimetre to ten millimetre. The central bond 106 between the at least two optical fibres 108-110 located in the centre of the intermittently bonded optical fibre ribbon 100 has a length in a range of 5 millimetres to 300 millimetres. Length of the central bond 106 may vary. The intermittently bonded optical fibre ribbon 100 has a pitch in a range of 160 micrometers to 250 micrometers.

Figure 2:
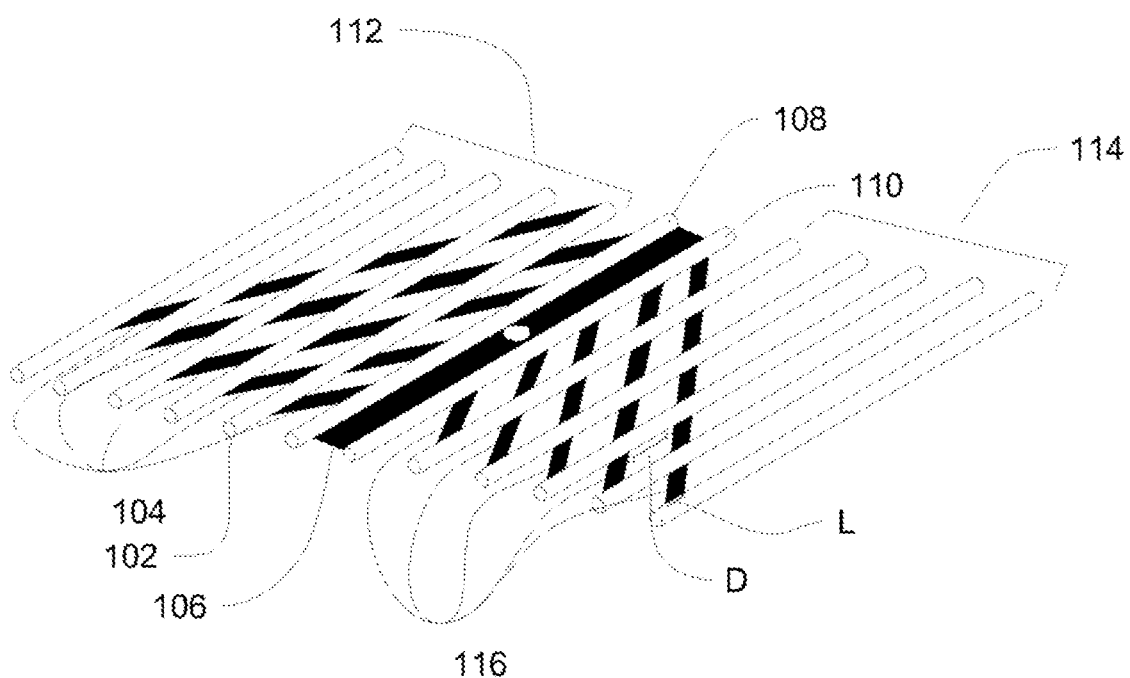
FIG. 2 illustrates a perspective view of the intermittently bonded optical fibre ribbon of FIG. 1.

According to FIG. 2, this is a perspective view 200 of the intermittently bonded optical fibre ribbon 100 of the FIG. 1. The one or more bonds may be arranged in a leaf like pattern. The leaf like pattern may repeat periodically in the longitudinal direction of the intermittently bonded optical fibre ribbon 100.

The intermittently bonded optical fibre ribbon 100 includes the first plurality of bonds 104, the central bond 106, and the second plurality of bonds 116, the first plurality of optical fibres 112 and the second plurality of optical fibres 114 (as explained in FIG. 1). Each of the first plurality of bonds 104, the central bond 106, and the second plurality of bonds 116 is parallelogram shaped bonds. Each of the first plurality of bonds 104, the central bond 106, and the second plurality of bonds 116 may have any suitable shape. The first plurality of bonds 104, the central bond 106, and the second plurality of bonds 116 may be placed in the intermittently bonded optical fibre ribbon 100 in the leaf like pattern. The leaf like pattern may be repeated in the intermittently bonded optical fibre ribbon 100 after a pre-defined length of the plurality of optical fibres 102.

Figure 3:
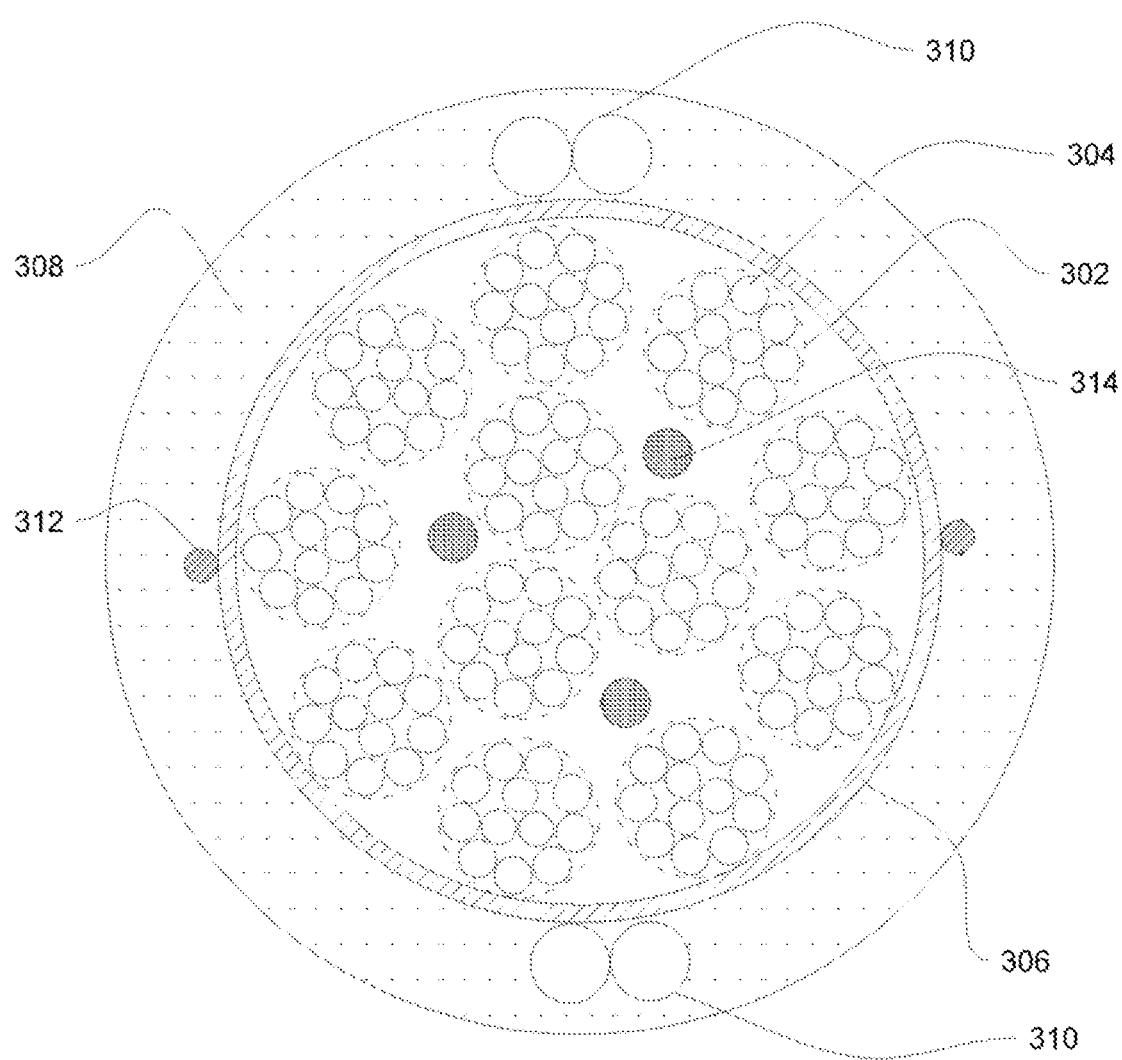
FIG. 3 illustrates an example of an optical fibre cable.

According to FIG. 3, this is an example of an optical fibre cable 300. The optical fibre cable 300 includes a plurality of bunches 302, a water blocking tape 306, a sheath 308, a plurality of strength members 310, a plurality of ripcords 312, and a plurality of water swellable yarns 314.

Each bunch of the plurality of bunches 302 includes a plurality of optical fibre ribbons 304. Each of the plurality of optical fibre ribbons 304 is the intermittently bonded optical fibre ribbon 100 of FIG. 1 or FIG. 2. Number of the plurality of bunches 302 in the optical fibre cable 300 may be 12. Number of the plurality of bunches 302 in the optical fibre cable 300 may be 24. Number of the plurality of bunches 302 may vary. Number of the plurality of optical fibre ribbons 304 in each bunch of the plurality of bunches 302 may be 12. Number of the plurality of optical fibre ribbons 304 in each bunch of the plurality of bunches 302 may be 24. Number of the plurality of optical fibre ribbons 304 of each bunch of the plurality of bunches 302 may vary. The plurality of optical fibre ribbons 304 includes the plurality of optical fibres 102. Number of plurality of optical fibres 102 in each of the plurality of optical fibre ribbons 304 may be 12. Number of the plurality of optical fibres 102 may vary. Number of the plurality optical fibres 102 inside the optical fibre cable 300 may be 1728 (corresponding to 12 bunches). Number of the plurality optical fibres 102 inside the optical fibre cable 300 may be 6912 (corresponding to 24 bunches). Number of the plurality of optical fibres 102 inside the optical fibre cable 300 may vary.

The optical fibre cable 300 may include the water blocking tape 306. The water blocking tape 306 may surround the plurality of bunches 302. In general, water blocking tapes provides water resistance to optical fibre cables over long period of time. The water blocking tape 306 facilitates complete insulation and protects the optical fibre cable 300 against water ingression. Further, the optical fibre cable 300 includes the sheath 308. The sheath 308 is an outer most layer of the optical fibre cable 300. The sheath 308 provides protection to the optical fibre cable 300 from environmental conditions. The environmental conditions include but may not be limited to rainfall, snowfall, wind, and sunlight.

The optical fibre cable 300 may include the plurality of strength members 310. The plurality of strength members 310 may be embedded inside the sheath 308 of the optical fibre cable 300. Each strength member of the plurality of strength members 310 provides tensile strength to the plurality of bunches 302. Further, the optical fibre cable 300 may include the plurality of ripcords 312. In general, ripcords are used for stripping of sheath of optical fibre cable. The plurality of ripcords 312 facilitates access to the plurality of optical fibres. The plurality of ripcords 312 may lie diametrically opposite to each other. Each of the plurality of ripcords 312 may have a circular shape. The plurality of ripcords 312 may have any suitable shape. Number of the plurality of ripcords 312 inside the optical fibre cable 300 may be two. Number of the plurality of ripcords 312 inside the optical fibre cable 300 may vary.

The optical fibre cable 300 may include the plurality of water swellable yarns 314. The plurality of water swellable yarns 314 may be positioned along the plurality of bunches 302. The plurality of water swellable yarns 314 prevents ingression of water in the optical fibre cable 300. In addition, the plurality of water swellable yarns 314 is used to absorb moisture inside the optical fibre cable 300.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. An intermittently bonded optical fibre ribbon comprising:
a plurality of optical fibres, wherein the plurality of optical fibres is defined by at least two adjacent central optical fibres, a first plurality of optical fibres and a second plurality of fibres, wherein the at least two adjacent central fibres are joined by a central bond, wherein the at least two adjacent central optical fibres are fully bonded along length of the at least two central fibres, wherein the first plurality of optical fibres are joined by a first plurality of bonds and the second plurality of optical fibres are joined by a second plurality of bonds, wherein the first plurality of bonds and the second plurality of bonds are arranged in a leaf like pattern.

2. The intermittently bonded optical fibre ribbon as recited in claim 1, wherein the first plurality of bonds and the second plurality of bonds are originated outwards from the central bond.

3. The intermittently bonded optical fibre ribbon as recited in claim 1, wherein the leaf like pattern repeats periodically in the longitudinal direction of the intermittently bonded optical fibre ribbon.

4. The intermittently bonded optical fibre ribbon as recited in claim 1, wherein the at least two adjacent central fibres are joined by a central bond, wherein the first plurality of bonds and the second plurality of bonds are originated outwards from the central bond, wherein the first plurality of bonds have a first plurality of veins, wherein the second plurality of bonds have a second plurality of veins, wherein the first plurality of veins and the second plurality of veins are such that subsequent adjacent fibres alternate between bonded adjacent fibres and unbonded adjacent fibres.

5. The intermittently bonded optical fibre ribbon as recited in claim 1, wherein the at least two adjacent central fibres are joined by a central bond, wherein the first plurality of bonds and the second plurality of bonds are originated outwards from the central bond, wherein the first plurality of bonds have a first plurality of veins, wherein the second plurality of bonds have a second plurality of veins, wherein the first plurality of veins and the second plurality of veins are at an angle of 30 to 60 degrees from the central bond.

6. The intermittently bonded optical fibre ribbon (100) as recited in claim 1, wherein the at least two adjacent central fibres (108, 110) are joined by a central bond (106), wherein the first plurality of bonds (104) and the second plurality of bonds (116) are originated outwards from the central bond (106), wherein the first plurality of bonds (104) have a first plurality of veins, wherein the second plurality of bonds (116) have a second plurality of veins, wherein number of bonds in the first plurality of veins and the second plurality of veins varies along the length of central bond (106).

7. The intermittently bonded optical fibre ribbon (100) as recited in claim 1, wherein the first plurality of optical fibres (112) and the second plurality of optical fibres (114) are bonded partially along non-central length of the plurality of optical fibres (102) forming a plurality of bonded regions L and a plurality of unbonded regions D along adjacent optical fibre of the first plurality of optical fibres (112) and the second plurality of optical fibres (114), wherein the plurality of unbonded regions D has length in a range of 5 millimetres to 100 millimetres.

8. The intermittently bonded optical fibre ribbon (100) as recited in claim 1, wherein the first plurality of optical fibres (112) and the second plurality of optical fibres (114) are bonded partially along non-central length of the plurality of optical fibres (102) forming a plurality of bonded regions L and a plurality of unbonded regions D along adjacent optical fibre of the first plurality of optical fibres (112) and the second plurality of optical fibres (114), wherein the plurality of bonded regions L has length in a range of 2 millimetres to 20 millimetres.

9. The intermittently bonded optical fibre ribbon (100) as recited in claim 1, wherein the at least two adjacent central optical fibres are sandwiched between the first plurality of optical fibres and the second plurality of optical fibres.

10. The intermittently bonded optical fibre ribbon (100) as recited in claim 1, wherein the first plurality of optical fibres and the second plurality of optical fibres are bonded partially along non-central length of the plurality of optical fibres.

* * * * *